United States Patent [19]
Montonen

[11] Patent Number: 5,364,436
[45] Date of Patent: Nov. 15, 1994

[54] METHOD OF SAGGING AND BENDING GLASS SHEETS

[75] Inventor: Jori Montonen, Tampere, Finland

[73] Assignee: Tamglass Engineering Oy, Tampere, Finland

[21] Appl. No.: 12,751

[22] Filed: Feb. 3, 1993

[30] Foreign Application Priority Data

Sep. 18, 1992 [FI] Finland ................... 924183

[51] Int. Cl.5 ................... C03B 23/025; C03B 23/03
[52] U.S. Cl. ................... 65/107; 65/106; 65/289
[58] Field of Search ................... 65/118, 106, 107, 260, 65/285, 289, 290, 287, 361, 273

[56] References Cited

U.S. PATENT DOCUMENTS

| | | |
|---|---|---|
| 3,468,645 | 9/1969 | McMaster et al. |
| 4,297,118 | 10/1981 | Kellar et al. ................... 65/104 |
| 4,349,375 | 9/1982 | Kellar et al. ................... 65/291 |
| 4,497,645 | 2/1985 | Peltonen ................... 65/107 |
| 4,626,267 | 12/1986 | Reese ................... 65/106 |
| 4,804,397 | 2/1989 | Stas et al. ................... 65/107 |
| 4,986,842 | 1/1991 | Peltonen ................... 65/107 |
| 5,049,178 | 9/1991 | Pereman et al. ................... 65/106 |

FOREIGN PATENT DOCUMENTS 881079 10/1989 Finland .

Primary Examiner—W. Gary Jones
Assistant Examiner—John Hoffmann
Attorney, Agent, or Firm—Burns, Doane, Swecker & Mathis

[57] ABSTRACT

The invention relates to a method for bending glass sheets. A glass sheet supported by a ring mould (5) is caused to sag while being heated in successive heating stations. The glass sheet reaches a final bending temperature in a bending station (14). A press-bending mould (16) is transferred from outside bending station (14) into the bending station through an opening (22') in its wall. The ring mould (5) along with its glass sheet is lifted by means of a hoist mechanism (6) upwards for pressing the glass sheet against press-bending mould (16) for completing the bending. The same bending station (14) can also be used solely for gravitational bending when said press-bending mould (16) is retained outside the bending station.

6 Claims, 4 Drawing Sheets

5,364,436

METHOD OF SAGGING AND BENDING GLASS SHEETS

The present invention relates to a method for bending glass sheets, said method comprising
placing glass sheets on a ring mould
heating a glass sheet supported by the ring mould to a bending temperature in successive heating stations
preliminary bending of a glass sheet gravitationally upon the ring mould
final bending of a partly bent glass sheet in a bending station by means of an overhead press-bending mould while the glass sheet is still supported by the same ring mould.

The invention relates also to an apparatus for bending glass sheets. The apparatus includes an elongated furnace, a number of ring moulds, a number of carrier wagons for carrying the ring moulds through the furnace along a first horizontal track, a bending station at the downstream end of the furnace, and a hoist mechanism located below the bending station for descending the wagon and a mould resting thereon from said first track onto a second, lower track.

DESCRIPTION OF THE PRIOR ART

U.S. Pat. No. 4,349,375 discloses an apparatus for bringing a reshapeable vacuum mould from outside a furnace through an opening in the furnace wall into the furnace, wherein a glass sheet is lifted from rollers by means of the vacuum mould. After being bent with the vacuum mould shaping, the glass sheet is descended onto a pick-up rim brought thereunder for carrying the glass sheet to tempering. Thus, the question is basically about other type of technology than in the present invention, which is based on supporting a glass sheet on a ring mould during the course of heating and bending.

The ring mould mould technique can be used for bending simple bending shapes merely by gravitational bending. More complex bending shapes can be produced with the ring mould technique when gravitational bending is assisted by using full-faced or partial-faced press bending moulds approaching a glass sheet from above or below or from both directions at the same time. U.S. Pat. No. 4,909,820 discloses an example of the case in which a glass sheet is bent by means of a reshapeable ring mould and the bending process is assisted by overhead partial-faced press bending moulds. This arrangement involves e.g. the following drawbacks. The press bending moulds constantly present in a furnace complicate the assembly of a heating resistance field above a glass sheet and also screen the thermal radiation applied from heating resistances to a glass sheet. In addition, the press bending moulds heat too much and it is difficult to provide them with mechanics that would withstand the constant heat of a furnace. Therefore, the cited publication U.S. Pat. No. 4,909,820 proposes the use of a bending station in which a glass sheet is not heated with an overhead resistance field. This type of bending station cannot be used for anything else but press bending; it cannot be used for bending glasses with a traditional method based on a ring mould and gravity without the use of a press bending mould. After all, gravitational bending requires that a glass sheet be heated while monitoring the deflection of a glass sheet.

The Applicants' U.S. Pat. No. 4,497,645 discloses a method and a furnace assembly for bending a glass sheet gravitationally with a ring mould.

SUMMARY OF THE INVENTION

The present invention relates to a further development is prior known method and assembly in a manner that one and the same apparatus can be used for effecting both press bending and traditional gravity-based bending with the same assembly at the same bending location.

A second, alternative object of the invention is to provide a press bending method and apparatus, facilitating the flexible variation of bending shapes without substantial production stops simply by replacing the press bending mould with another one of a different shape. This facilitates the use of lightweight, simple-design press bending moulds, which need not be reshapeable.

These objects of the invention are achieved on the basis of the characterizing features set forth in the appended claims.

BRIEF DESCRIPTION OF THE DRAWING

One exemplary embodiment of the invention will now be described with reference made to the accompanying drawings, in which.

DESCRIPTION OF THE PREFERRED EMBODIMENT

Figure 1:
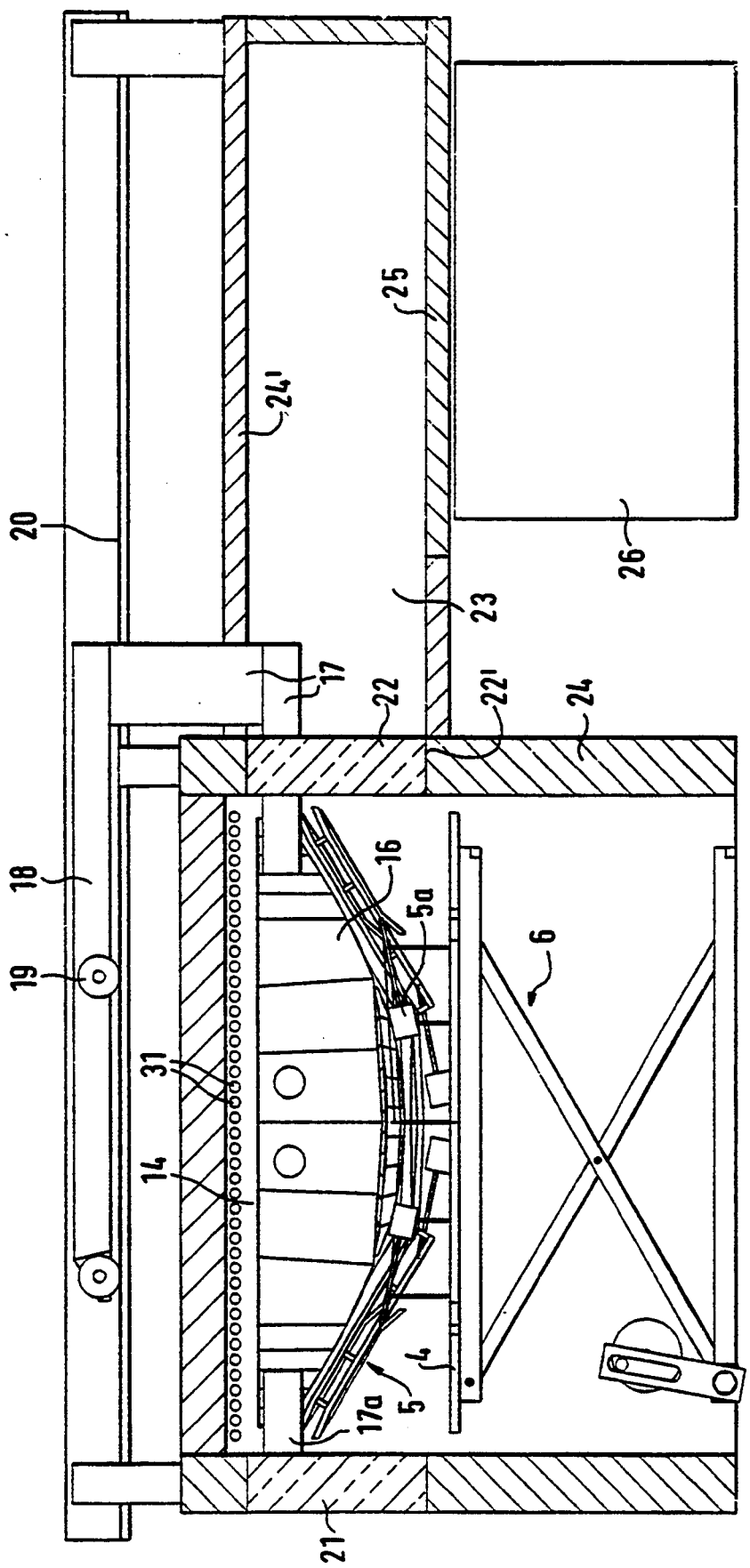
FIG. 1 shows an apparatus of the invention in cross-section at a bending station.
Figure 2:
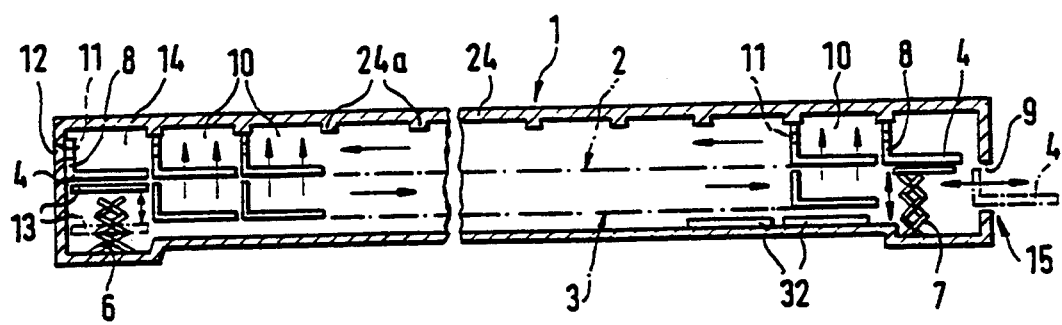
FIG. 2 is a schematic view of an apparatus of the invention in vertical section, corresponding to a furnace assembly disclosed in U.S. Pat. No. 4,497,645.

The description and operating principle of a furnace assembly shown in FIG. 2 is disclosed in U.S. Pat. No. 4,497,645, incorporated herein by reference. A general furnace design is briefly described hereinafter with reference made to FIG. 2. An elongated furnace 1 is separated from its environment with thermally insulated walls 24, serving as the ceiling, side walls and floor of a furnace. The furnace includes an upper conveyor track 2 and a lower conveyor track 3 for carrying wagons 4 there along. Each wagon 4 carries a bending mould 5 for placing a glass to be bent thereupon. Extending downwards from a thermally insulated furnace ceiling 24a at spaces equalling the length of wagon 4 is a heat insulation 24, the top edge of a front wall 8 extending to the level of its bottom surface. When a wagon train on upper track 2 is at a standstill in a manner that said front walls 8 are in line with heat insulations 24a, a separate heating station 10 is formed at each wagon in the longitudinal direction of a furnace. The ceiling of each heating station 10 is provided with electric resistance elements, the temperature of successive heating stations 10 rising gradually when progressing towards the downstream end of furnace 1.

At the downstream or outlet end of the furnace is a heating and bending station 14, which is provided with an elevator 6 for lowering wagons 4 from upper track 2 onto lower track 3. The elevator 6 is preferably an articulated jack. Alternatively, it is possible to employ horizontal brackets mounted on vertical guides, as described in the Patent application FI-915016. Elevator 6 is preferably fitted with a thermally insulated floor 13. The end wall of bending station 14 includes inspection windows 12 for monitoring the bending of a glass sheet. In line with windows 12, said front wall 8 of each wagon is also provided with inspection windows 11. After bending a glass sheet, said wagon 4 is transferred by means of elevator 6 from the upper onto the lower track for carrying wagons 4 in the opposite direction towards a loading station 15, said wagon 4 advancing therein through a wagon opening 9. After the replacement of glass, said wagon 4 is hoisted with elevator 6 onto upper track 2.

The above-described construction and operation are prior known from the Applicants' U.S. Pat. No. 4,497,645. A further reference can be made to the Applicants' U.S. Pat. No. 4,986,842, which discloses yet a few more details in relation to this particular type of furnace.

This prior known type of furnace is well suitable for bending windshields, a majority of which are still so easy to bend that the bending can be readily effected by using ring-mould bending or sagging by gravity. Especially in the automobile industry, however, there is a clearly distinct tendency towards more rounded and aerodynamic shapes. This will lead to a requirement for bending biconvex, S-shapes and other complicated shapes. This requirement cannot be met with a sufficient manufacturing accuracy by a ring-mould method based on gravitational bending. In order to make a furnace assembly of the invention able to carry out not only gravitational bending but also press-bending of more demanding shapes, said bending station 14 is provided with an arrangement described in more detail hereinafter.

An overhead press-bending mould 16, whose bottom surface matches a desired final bending shape and is consistent with the surface of a ring mould 5, is adapted to be reciprocated in horizontal direction into bending station 14 and out of it into a thermally insulated space 23. For this reciprocation, said mould 16 is mounted with a suspension bracket or pylon 17 on a wagon 18 running on wheels 19 along a rail 20. The rail 20 comprises, e.g., a C-profile, inside which said wagon 18 is movable. The flat bracket or pylon 17 is able to travel in the slot of profiled rail 20 as well as in a slot made in the top wall of thermally insulated space 23. The thermally insulated wall of space 23 is indicated by reference numeral 24'. The wall of bending station 14 is provided with an opening 22' for moving said mould 16 in and out therethrough. The horizontal portion of bracket or pylon 17 carries a wall section 22 for closing said opening 22' when mould 16 is in bending station 14. On the other side of mould 16, the end of bracket 17a carries a wall section 21 for closing said opening 22' after moving said mould 16 into space 23. On the one hand, this arrangement is capable of preventing the overheating of mould 16 and, on the other hand, the excessive leakage of heat through the thermally insulated walls 24' of space 23. This arrangement is necessary when replacing moulds 16 of varying shapes in space 23 through its openable floor gate 25. Below said gate 25 can be located a conveyor track or a store 26 for a number of different press-bending moulds 16. The bottom surface of mould 16 must naturally correspond to the final top surface shape of a ring mould 5 used at any given time.

The ring mould 5 comprises typically a hinged mould which, through the action of weights 5a, pivots to its final configuration while a glass sheet bends upon softening.

Figure 3:
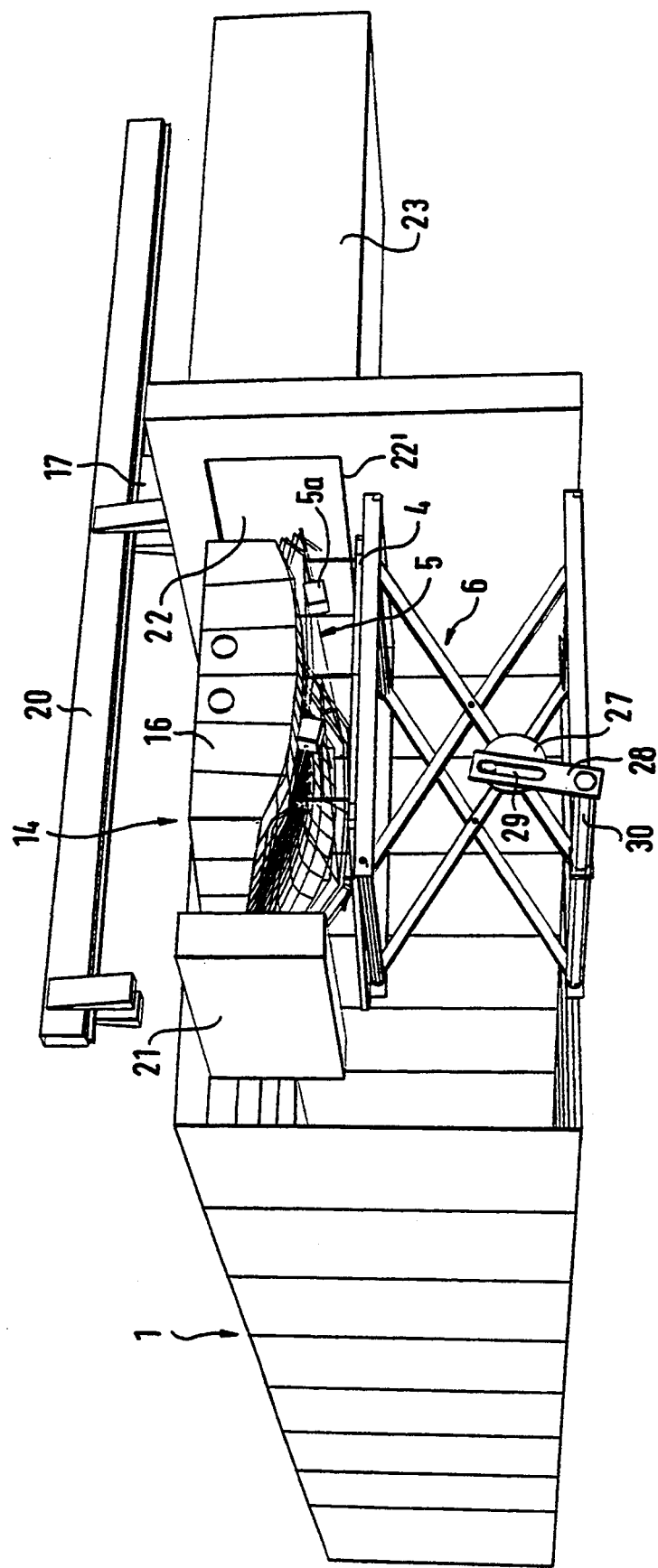
FIG. 3 is a schematic perspective view an apparatus of the invention as viewed from the adjacent to bending station, the walls being partially cut away.
Figure 4:
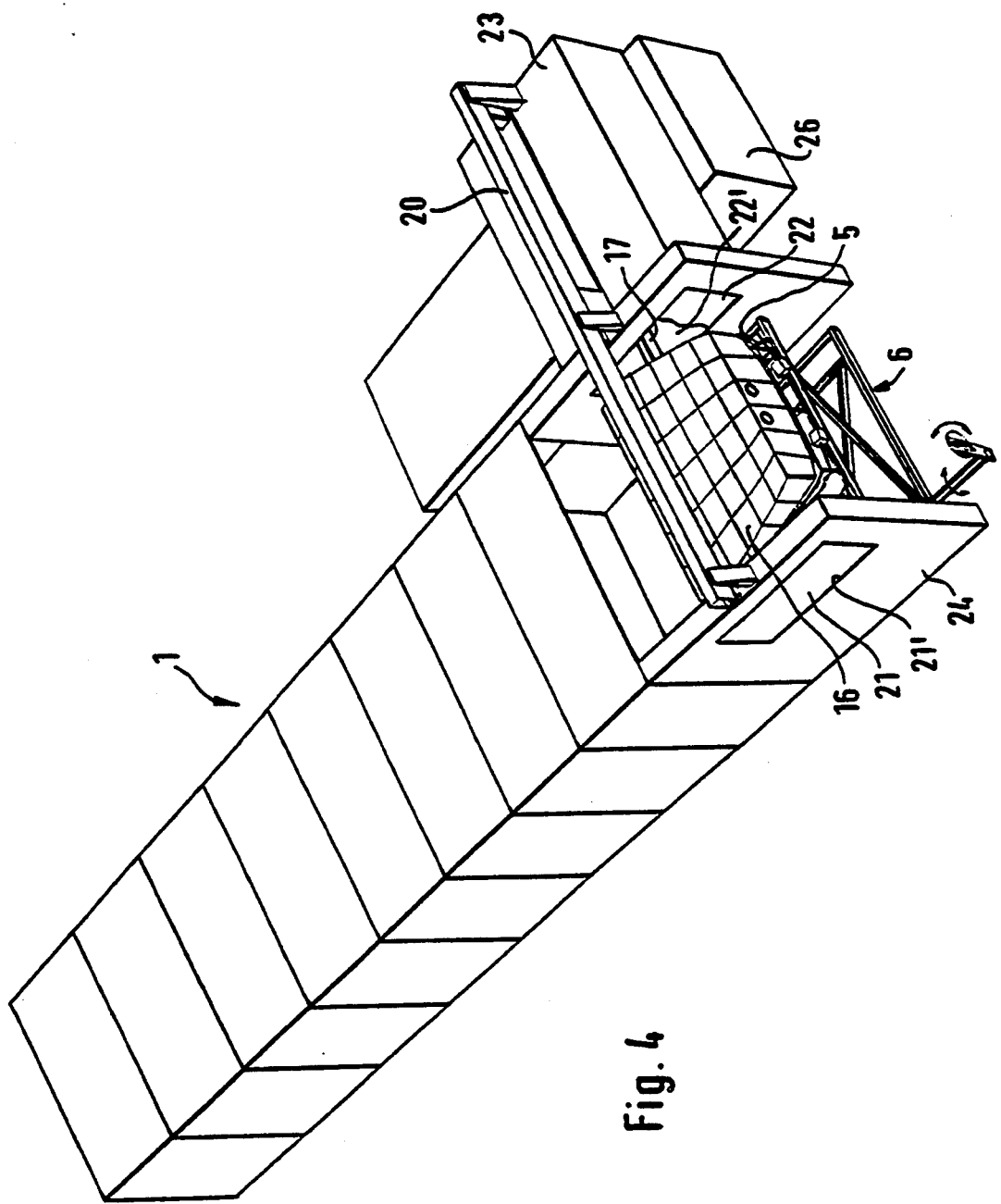
FIG. 4 is a view otherwise similar to FIG. 3 but seen more obliquely from above and provided with a store 26 for replaceable press moulds.

FIG. 3 illustrates in more detail the operating mechanism of an articulated jack 6, comprising a crank gear 27 driven by a motor, not shown. A pin moving in a slot 20 turns an arm 28 rotating a shaft 30, which in turn pivots the articulated arms of articulated jack 6. This type of crank-arm drive provides a preferable moment curve a speed control at critical shifting points so as to avoid excessive accelerations. In addition, the traveling distance of mould 5 must be precisely controllable as it approaches mould 16 during the course of press bendings.

Operation of the apparatus proceeds as follows.

In loading station 15, a cold flat piece of glass is placed on a ring mould supported by wagon 4. Wagon 4 is forwarded onto upper track 2 and the glass sheet is heated in successive heating stations 10. A final bending temperature is not reached until bending station 14, whose ceiling is also provided with heating resistances 31. As the glass sheet reaches a temperature to begin its gravitational bending, the bending process is monitored through window 12. After reaching a certain degree of bending, said articulated jack 6 is used for lowering wagon 4 along with its mould 5 downwards a distance sufficient for carrying mould 16 into bending station 14 along a horizontal track defined by transfer rail 20. Wall sections 21 and 22 can be used for parking mould 16 precisely at a predetermined spot. Thereafter, said articulated jack 6 is used for hoisting wagon 4 along with its mould 5 upwards in view of effecting a press-bending operation between moulds 5 and 16. Wagon 4 can be mounted upon the floor of hoist 6 to be displaceable in such a manner that the aligning equipment between moulds 16 and 5 are able to set moulds 16 and 5 accurately prior to final press bending. Such aligning equipment may simply consist of tapered pins and recesses or holes for centering the pins while shifting mould 5/mould wagon 4. Alternatively, provided there are no lateral clearances in hoist mechanism 6, the alignment of wagon 4 can be done on top of hoist mechanism 6.

After completing the press bending, said ring mould 5 is lowered down by means of hoist mechanism 6 and said press-bending mould 16 is forwarded into space 23.

When the apparatus should be used for bending less complex bending shapes solely by the application of gravity, said press-bending mould 16 is retained in space 23 all the time and the bending is effected as set forth in U.S. Pat. No. 4,497,645.

If the apparatus is used mainly for press bending and various bending shapes are desired without substantial production cuts, the opposite side of the bending station can be provided with another space 23 with its press-bending mould 16. Thus, the replacement of mould 16 can be carried out on one side while the other side mould 16 is in operation. A particular benefit obtained by a production line of the invention is its flexibility in terms of diversified production. This benefit has been achieved in a mechanically simple manner by making use of the lifting movement of hoist mechanism 6 for reciprocating press-bending mould 16 along a horizontal track.

Naturally, the invention is not limited to the above exemplary embodiment but several structural details can be modified within the scope of the annexed claims.

I claim:

1. A method for bending glass sheets, said method comprising:

placing a glass sheet on a ring mould at a loading station;

heating the glass sheet carried by the ring mould to a bending temperature in successive heating stations;

allowing the heated glass sheet carried by the ring mould to sag by gravity a predetermined amount in a first bending station;

transferring the ring mould and the sagged glass sheet into a final bending station;

transferring a press-bending mould into the final bending station from a position outside the final bending station to a position above the ring mould; and, lifting the ring mould and sagged glass sheet upwards to press the glass sheet against the press-bending mould while the glass sheet is supported on the ring mould for bending said glass sheet to a final shape.

2. A method as set forth in claim 1, further comprising:

advancing the ring mould on a carrier wagon along a first horizontal track through the successive heating stations; and, after the step of press-bending the glass sheet, lowering the carrier wagon with the ring mould and glass sheet onto a second, lower track;

removing the press-bent glass sheet from the ring mould;

moving the carrier wagon along with the ring mould along said second track to the loading station and from there to an upstream end of said first track.

3. A method as set forth in claim 1, wherein the ring mould is of a selected shape and is provided at the loading station and the press-bending mould has a corresponding shape so that the glass sheet is bent to a predetermined final shape.

4. The method as claimed in claim 1, wherein said press bending mould is transferred into said final bending station from an enclosed, thermally insulated space through an opening in the final bending station wall.

5. The method as claimed in claim 1, wherein, prior to transferring the press-bending mould into the final bending station, the ring mould is lowered downwards from a transfer level of a first upper track.

6. The method as claimed in claim 1, wherein the lifting of the ring mould and the sagged glass sheet in the final bending station is done by a hoist mechanism.

* * * * *